United States Patent
Lee et al.

(10) Patent No.: US 8,630,005 B2
(45) Date of Patent: Jan. 14, 2014

(54) METHOD OF TRANSMITTING LOG INFORMATION ON DOCUMENT USING METADATA AND HOST DEVICE, IMAGE FORMING APPARATUS AND SYSTEM USING THE SAME METHOD

(75) Inventors: Dong-seok Lee, Suwon-si (KR); Han-nam Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 305 days.

(21) Appl. No.: 12/539,126

(22) Filed: Aug. 11, 2009

(65) Prior Publication Data
US 2010/0103449 A1    Apr. 29, 2010

(30) Foreign Application Priority Data
Oct. 23, 2008    (KR) ........................ 10-2008-0104205

(51) Int. Cl.
*G06K 15/02*    (2006.01)

(52) U.S. Cl.
USPC ........ 358/1.15; 358/1.14; 358/1.13; 709/206; 709/220

(58) Field of Classification Search
USPC ....................... 358/1.15; 709/206; 235/462.01
See application file for complete search history.

(56) References Cited

U.S. PATENT DOCUMENTS

| | | | |
|---|---|---|---|
| 6,219,151 B1 * | 4/2001 | Manglapus et al. | 358/1.15 |
| 7,139,757 B1 * | 11/2006 | Apollonsky et al. | 1/1 |
| 7,328,245 B1 * | 2/2008 | Hull et al. | 709/206 |
| 7,424,670 B2 * | 9/2008 | Burke et al. | 715/230 |
| 7,428,578 B1 * | 9/2008 | Hull et al. | 709/206 |
| 7,520,423 B2 * | 4/2009 | Peters et al. | 235/379 |
| 8,174,712 B2 | 5/2012 | Richardson et al. | |
| 2005/0086240 A1 * | 4/2005 | Richardson et al. | 707/100 |
| 2006/0004815 A1 * | 1/2006 | Murata et al. | 707/101 |
| 2006/0126114 A1 * | 6/2006 | Choi et al. | 358/1.15 |
| 2006/0273177 A1 * | 12/2006 | Lee et al. | 235/462.01 |

FOREIGN PATENT DOCUMENTS

| | | |
|---|---|---|
| JP | 2002-523824 | 7/2002 |
| JP | 2005-176314 | 6/2006 |
| KR | 2006-66274 | 6/2006 |
| KR | 2006-126066 | 12/2006 |
| KR | 2008-52525 | 6/2008 |

OTHER PUBLICATIONS

Korean Office Action mailed Nov. 19, 2012 issued in corresponding Korean Patent Application 10-2008-0104205.

* cited by examiner

*Primary Examiner* — Steven Kau
*Assistant Examiner* — Ashish K Thomas
(74) *Attorney, Agent, or Firm* — Staas & Halsey LLP (57) ABSTRACT

There are provided a method of transmitting log information on a document using metadata which can manage log information based on the metadata, and a host device, an image forming apparatus and an image forming system using the same method. The method includes: setting up metadata for receiving log information on a document in a host device; storing the set up metadata and printing data of the document; outputting the document; generating the log information on the document; and transmitting the log information using the metadata.

16 Claims, 9 Drawing Sheets

| | | |
|---|---|---|
| Default [From:] Address : | | 40 |
| | Note : In case Local or Network Authentication is enabled, a valid E-mail address should be configured | |
| Auto Send To Self : | [v] Automatically add the senders [From:] address to the recipient list | |
| Default Subject : | Scan from Samsung MFP | |
| Enable default mail text : | [v] | |
| Default Body Text : | Please open the attached document, It was scanned and sent to you using Samsung | |
| Print Confirmation Sheet : | Always ⌄ | |

FIG. 3

> FTP Setup >>

> FTP Server List Entry — 51

Index : [1 ▾]

Alias for Setup : [          ]

> FTP Server setup — 53

IP Address or Host Name :   ⦿ IP Address

○ Host Name
Note: If Host Name is selected. DNS Server Address should be mentioned in TCP/IP setting page Server address and Port : [          ] [21] (1~65535)

> Login — 57

Anonymous : ☐

Login Name : [          ]

Login Password : [          ]

> Scan File Details — 59

Scan File Folder : [          ]

Scan Filename : [DOC]

Filing Method : [Change Name ▾]

FIG. 4

> SMB Setup >>

> SMB Server List Entry

Index :  [1 ∨]

Alias for the Setup :  [            ]

— 61

> SMB Server setup

IP Address or Host Name :  ⦿ IP Address
                            ○ Host Name(NetBIOS)

Server address and Port :  [        ]  [139]  (1~65535)

Share name :  [            ]

— 63

> User Account

Anonymous :  ☐

User Name :  [            ]

User Password :  [            ]

User Domain :  [            ]

— 65

> Scan File Details

Scan File Folder :  [            ]

Scan Filename :  [DOC]

Filing Method :  [Change Name ∨]

| ☐ | Index | User Name | E-mail Address |
|---|---|---|---|

> Local Address Book

Add    Import

Local Address Book is empty.

FIG. 6

> Server List

| | Index | Alias | Server Address | Login |
|---|---|---|---|---|
| | | | Server List is Empty. | |

Add

Import

FIG. 7

| LOG INFORMATION TYPE | ☐ E-MAIL |
| | ☐ SMB SERVER |
| | ☐ FTP SERVER |

71

USER NAME: [          ] ADD
E-MAIL ADDRESS: [          ] ADD
SMB SERVER: [          ] ADD
FTP SERVER: [          ] ADD

METHOD OF TRANSMITTING LOG INFORMATION ON DOCUMENT USING METADATA AND HOST DEVICE, IMAGE FORMING APPARATUS AND SYSTEM USING THE SAME METHOD

CROSS-REFERENCE TO RELATED APPLICATION

This application claims the benefit of Korean Patent Application No. 2008-104205, filed Oct. 23, 2008 in the Korean Intellectual Property Office, the disclosure of which is incorporated herein by reference.

BACKGROUND OF THE INVENTION

1. Field of the Invention

Apparatuses and methods consistent with aspects of the present invention relate to a method of transmitting log information on a document using metadata which can manage log information based on the metadata, and a host device, an image forming apparatus and an image forming system using the same method.

2. Description of the Related Art

In general, an image forming apparatus (such as a printer or a multi functional printer) includes at least one of printing, scanning, copy and facsimile functions. If a user performs printing, scanning, copy and/or facsimile transmitting/receiving operations with the image forming apparatus, log information is stored in the image forming apparatus. Log information refers to information about a user name, the kind of operation, operation time, the number of a printed paper, etc. Accordingly, the user can monitor the printing operation in the image forming apparatus.

However, a conventional image forming apparatus does not include a configuration for utilizing metadata. Here, metadata refers to data which includes information on an account for receiving log information about a printing operation generated by a document creator. Accordingly, the conventional image forming apparatus can not recognize information about a user, an output point, etc. for a specific document.

SUMMARY OF THE INVENTION

Accordingly, it is an aspect of the present invention to provide a method of transmitting log information on a document using metadata which can receive log information on a generated document using metadata generated by a document creator and receive a feedback of a user for the document, and a host device, an image forming apparatus and an image forming system using the same method.

The foregoing and/or other aspects of the present invention can be achieved by providing a method of transmitting log information on a document using metadata, including: setting up metadata for receiving log information on a document in a host device; storing the set up metadata and printing data of the document; outputting the document; generating the log information on the document; and transmitting the log information using the metadata.

According to an aspect of the invention, the metadata may include at least one of an account and a server address for receiving the log information.

According to an aspect of the invention, the storing may include storing the metadata and printing data in at least one of an image forming apparatus and a server which are connected to the host device.

According to an aspect of the invention, the outputting may include outputting at least one of outputting, editing, copying and transmitting of the document.

According to an aspect of the invention, the transmitting may include transmitting the generated log information to at least one of an E-mail, an SMB server and an FTP server.

According to an aspect of the invention, the at least one of the E-mail, the SMB server and the FTP server to which the log information is to be transmitted may be inputted from a user.

According to an aspect of the invention, the method may include displaying a recipient to which the generated log information is to be transmitted.

According to an aspect of the invention, the metadata may be included in the printing data.

According to an aspect of the invention, the metadata may be generated in at least one of a printer driver and an application program of the host device.

According to an aspect of the invention, the log information may include at least one of a user name, ID, the number of copies, operation time and an Internet address of an image forming apparatus connected to the host device.

According to an aspect of the invention, the method may include authenticating a user who wants to output the document.

According to an aspect of the invention, the method may include acquiring information on a feedback of the user using an E-mail address of the user acquired in the authenticating.

The foregoing and/or other aspects of the present invention can be achieved by providing a host device including: a user interface through which metadata setup information is inputted; a printer driver which sets up the metadata for receiving log information on a document based on the metadata setup information; a transmitting/receiving unit which transmits printing data and the metadata to an image forming apparatus and receives the log information; and a controller which controls the user interface, the printer driver and the transmitting/receiving unit.

According to an aspect of the invention, the metadata may include at least one of an account and a server address for receiving the log information.

According to an aspect of the invention, the log information may include at least one of a user name, ID, the number of copies, operation time and an Internet address of the image forming apparatus.

The foregoing and/or other aspects of the present invention are achieved by providing an image forming apparatus which is connected to a host device which sets up metadata for receiving log information on a document, including: a storage unit which stores the set up metadata and printing data of a document; an output unit which outputs the document; a log information generating unit which generates log information on the output document based on the metadata; a transmitting/receiving unit which receives the metadata and printing data from the host device and transmits the log information generated in the log information generating unit; and a controller which controls the storage unit, the output unit, the log information generating unit and the transmitting/receiving unit.

According to an aspect of the invention, the output unit may perform at least one of outputting, editing, copying and transmitting of the document.

According to an aspect of the invention, the log information may include at least one of a user name, ID, the number of copies, operation time and an Internet address of the image forming apparatus.

According to an aspect of the invention, the transmitting/receiving unit may transmit the generated log information to at least one of an E-mail, an SMB server and an FTP server.

According to an aspect of the invention, the image forming apparatus may include a user authentication processing unit which authenticates a user who wants to output the document.

The foregoing and/or other aspects of the present invention are achieved by providing an image forming system, including: a host device which receives metadata setup information and sets up metadata for receiving log information on a document based on the metadata setup information; and an image forming apparatus which receives printing data and the metadata from the host device, outputs the document, generates the log information on the document outputted based on the metadata and transmits the log information on the generated document.

According to an aspect of the invention, the host device may include a user interface through which the metadata setup information is inputted; and a printer driver which sets up the metadata for receiving the log information; a transmitting/receiving unit which transmits the printing data and the metadata to the image forming apparatus and receives the log information; and a controller which controls the user interface, the printer driver and the transmitting/receiving unit, and wherein the metadata includes at least one of an account and a server address for receiving the log information.

Additional aspects and/or advantages of the invention will be set forth in part in the description which follows and, in part, will be obvious from the description, or may be learned by practice of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 1:
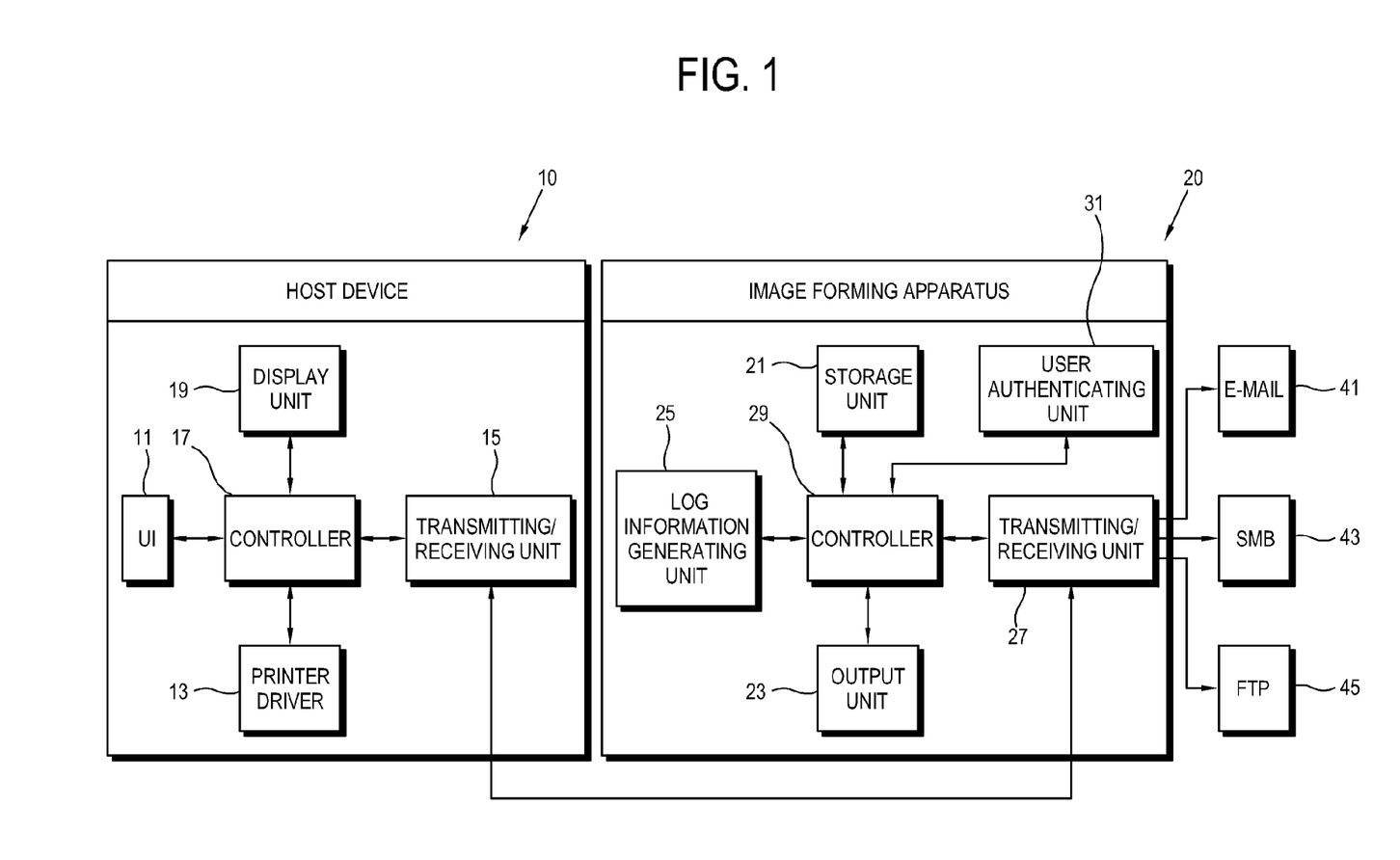
FIG. 1 is a schematic block diagram illustrating an image forming system according to an exemplary embodiment of the present invention.

FIG. 1 is a schematic block diagram illustrating an image forming system according to an exemplary embodiment of the present invention. Referring to FIG. 1, the image forming system includes a host device 10 and an image forming apparatus 20 which is connected to the host device 10. The host device 10 can be a computer, a camera, a personal digital assistant, netbook or other like computational device. The host device 10 receives metadata setup information and sets up metadata for receiving log information on a document based on the received metadata setup information. The metadata refers to data which includes information on an account for receiving log information on a document generated by a document creator. The metadata includes a receiving account and/or a server address for receiving the log information. The log information includes a user name, ID, the number of copies, operation time and an Internet address of the image forming apparatus 20. However, it is understood that the log information can include other information in addition to or instead of the above listed information.

To this end, the host device 10 includes a user interface (UI) 11, a printer driver 13, a first transmitting/receiving unit 15 and a first controller 17 for controlling the above components. While described as separate elements, it is understood that the UI 11 and the printer driver 13 can be implemented as programs stored on computer readable media and executed using the controller 17 or can be executed using other controllers or processors separate from the controller 17.

Figure 2:
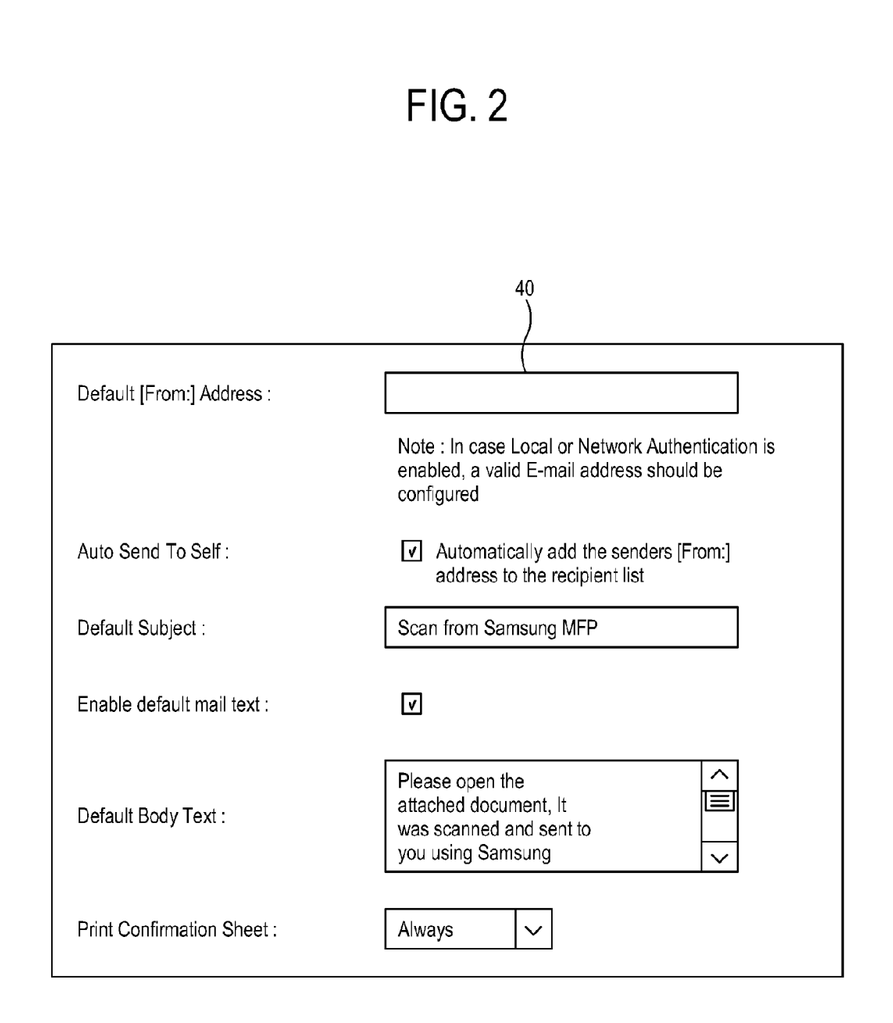
FIG. 2 illustrates a user interface (UI) screen for setup of a simple mail transfer protocol (SMTP) client for an E-mail in an image forming system according to an exemplary embodiment of the present invention.
Figure 3:
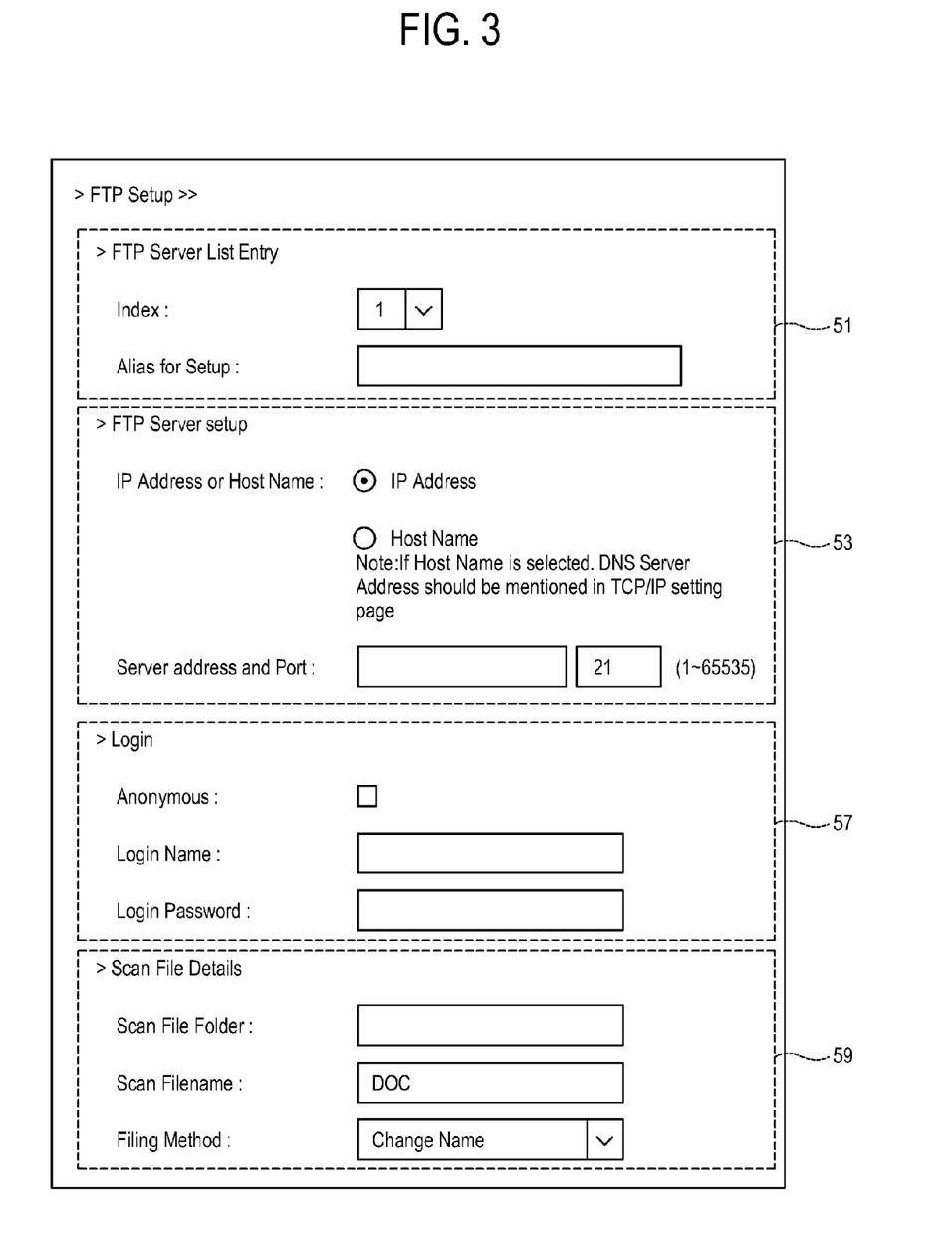
FIG. 3 illustrates a UI screen for setup of a file transfer protocol (FTP) server in an image forming system according to an exemplary embodiment of the present invention.
Figure 4:
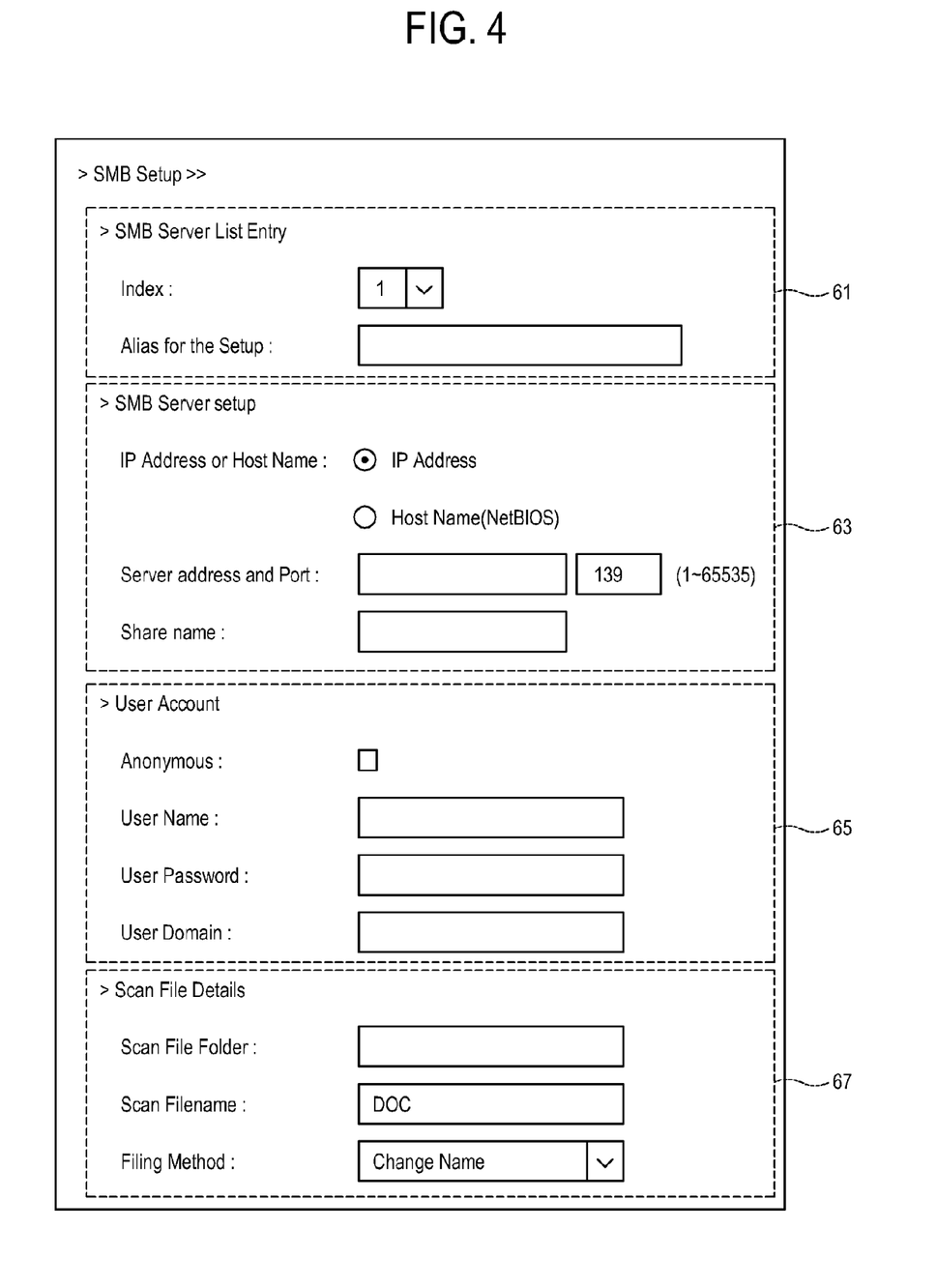
FIG. 4 illustrates a UI screen for setup of a server message block (SMB) server in an image forming system according to an exemplary embodiment of the present invention.

While not required in all aspects, the UI 11 is a graphic user interface displayed on a display unit 19. As shown in FIGS. 2 to 4, the document creator may input the metadata setup information through the UI screen 11. However, while shown as included in the host device 10, it is understood that the display unit 19 can be separate from the host 10.

FIG. 2 illustrates an example of a UI screen for setup of a simple mail transfer protocol (SMTP) client for an E-mail address 41. The SMTP is used for sending/receiving the E-mail over the Internet. In the case that the document creator desires to set up an E-mail account, the document creator may input the E-mail account through an address input box 40. Further, in the case that the image forming apparatus 20 is authenticated as a network apparatus or is a local apparatus, it is possible to set up the E-mail account as a default value without E-mail account input. While described in terms of an E-mail address 41, it is understood that the address 41 can be through any messaging technique, such as short message service (SMS), text messaging, instant messaging (IM), or other mechanisms used to send messages.

FIG. 3 illustrates an example of a UI screen for setup of a file transfer protocol (FTP) server 45. The document creator may input an FTP server list 51, perform FTP server setup 53 and login 57, and input scan file details 59, through the FTP server setup UI screen.

FIG. 4 illustrates an example of a UI screen for setup of a server message block (SMB) server 43. The document creator may input an SMB server list 61, perform SMB server setup 63 and input a user account 65 and scan file details 67, through the SMB setup UI screen. In this respect, the SMB refers to a file/printer sharing protocol used in a Windows environment such as Windows 95 or Windows NT.

Figure 7:
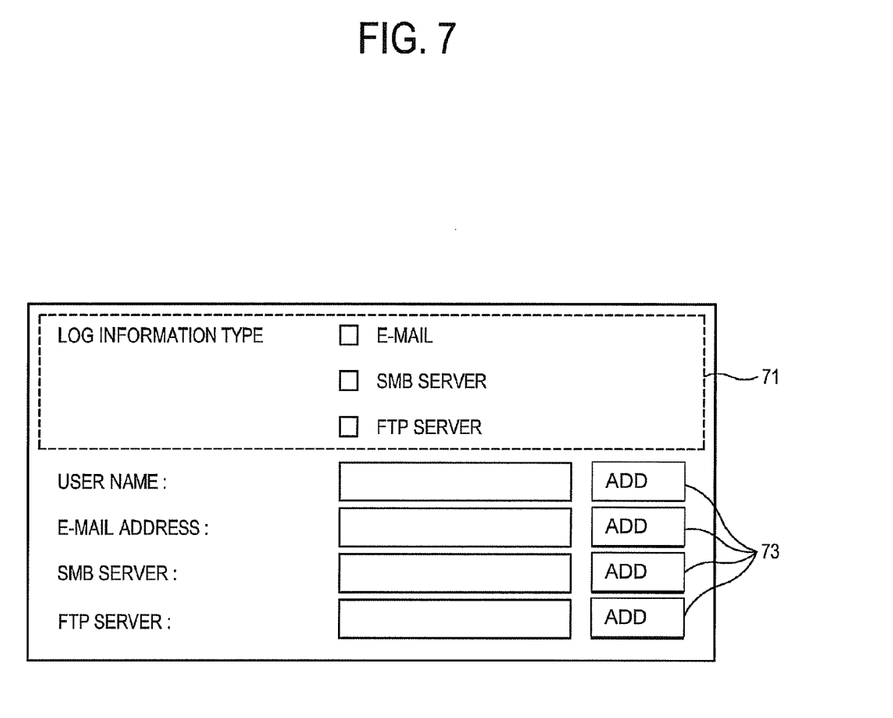
FIG. 7 illustrates a UI screen for setup of a server for receiving log information in an image forming system according to an exemplary embodiment of the present invention.

Further, the host device 10 sets up an E-mail account 41, an SMB server 43 and an FTP server 45 to receive log information. To this end, the UI screen shown in FIG. 7 is provided according to an aspect of the invention. The document creator inputs an account for receiving log information on a document to be generated in a driver (for example, log information on printing data). A log information recipient type screen 71 provides selection windows for the E-mail address, SMB server and FTP server 41, 43, 45. The document creator may select at least one of the selection windows to select at least one of the E-mail address, SMB server and FTP server 41, 43, 45. Further, in designating a user name, the E-mail address 41, SMB server 43 and FTP server 45, the UI screen may further include ADD buttons 73 for a plurality of selections.

Figure 5:
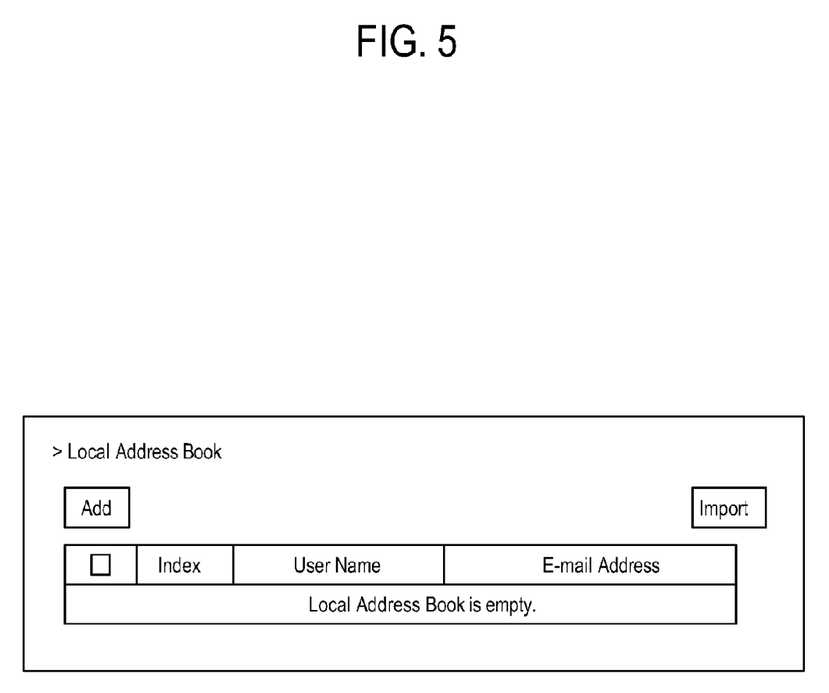
FIGS. 5 and 6 respectively illustrate examples of a UI screen displaying an E-mail list and an FTP/SMB server list in the case that a server is set up through the UI screen in FIG. 7.
Figure 6:
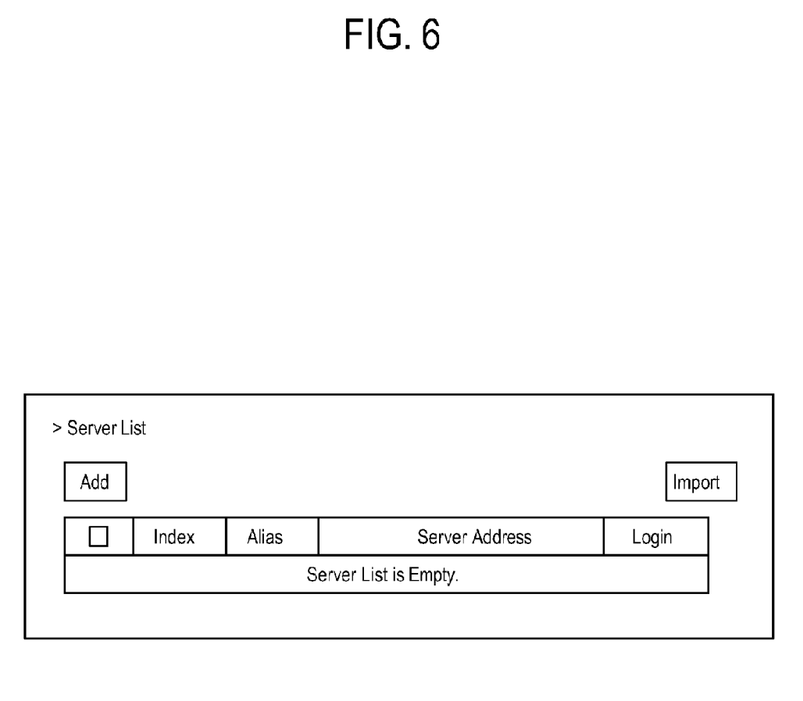

In the case that the server is set up through the UI screen shown in FIG. 7, an E-mail list and an FTP/SMB server list which have been previously set up may be displayed as shown in FIGS. 5 and 6. FIG. 5 illustrates a local address book for displaying a user name and an E-mail address per each user; and FIG. 6 illustrates a server list for displaying an index number, a nickname (Alias), a server address and login information. The document creator selects a document for a printing operation among the local address book in FIG. 5 or the server list in FIG. 6.

The printer driver 13 sets up metadata for receiving the log information based on the metadata setup information inputted through the UI 11. Further, the printer driver 13 converts the document generated by the document creator into printing data for printing the generated document. In this respect, a standard language may include a printer job language (PJL), an extensible mark-up language (XML), or the like. The printing data generated by the printer driver 13 may include the metadata. For example, the metadata may be added in the format of the PJL under an emulation exit command.

However, it is understood that the metadata can be otherwise attached to the document after the printing data is generated. For instance, where the document is received with already created metadata, the metadata setup information need not be generated at the host 10. For instance, where the document creator created the document and metadata on another computer other than the host 10 and the host 10 merely received the document and requests that the document be printed using the image forming apparatus 20, the UI 11 need not be used. Instead, the printer driver 13 need only create the printing data and the controller 17 can transmit the created printing data and the received metadata without again generating the metadata.

While described in terms of a printer driver 13, it is understood that the metadata could be set up using other programs stored on a computer readable medium in the host 10.

The first transmitting/receiving unit 15 is connected to the image forming apparatus 20 through wired and/or wireless protocols. The first transmitting/receiving unit 15 transmits the printing data and the metadata to the image forming apparatus 20 and receives the log information on a document outputted from the image forming apparatus 20.

Referring to FIG. 1, the image forming apparatus 20 includes a storage unit 21, an output unit 23, a log information generating unit 25, a second transmitting/receiving unit 27 and a second controller 29 for controlling the above components. The controller 29 can be one or more processors executing software to control operations of the image forming apparatus 20.

Figure 8:
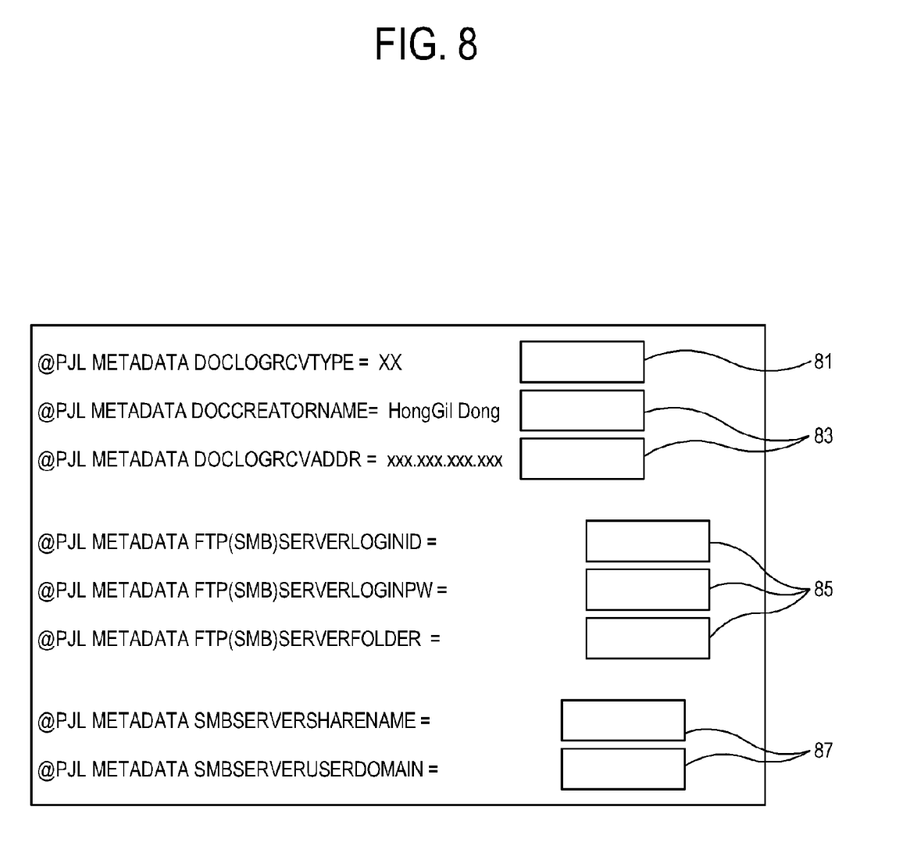
FIG. 8 illustrates metadata inputted to a metadata processing unit in an image forming system according to an exemplary embodiment of the present invention.

The storage unit 21 stores the metadata set up in the host device 10 and the printing data of the document. The output unit 23 outputs the document based on the printing data stored in the storage unit 21. More specifically, the output unit 23 performs at least one of outputting, editing, copying and transmitting of the document. While not limited thereto, an example of outputting by the output unit 23 includes printing of the document, and an example of transmitting includes faxing of the document The log information generating unit 25 analyzes the metadata transmitted from the host device 10 and generates log information about the output document. Referring to FIG. 8, the metadata transmitted from the host device 10 is processed in the format of the PJL command and includes a log information recipient type 81 set up by the document creator, a user name 83 for the document creator, an address 83 to which the log information is received, additional information 85 in the case of the SMB/FTP server 43, 45, an additional information 87 added only in the case of the SMB server 43, etc. The log information generating unit 25 generates log information to be transmitted to the E-mail address 41 or the SMB/FTP server 43, 45 based on the processed metadata.

The second transmitting/receiving unit 27 transmits the log information on the document outputted to at least one of the set up account and server address for receiving the log information. The account may include an E-mail address 41; and the server may include an SMB server 43 and an FTP server 45. While shown as separate, the account for the E-mail address 41, SMB server 43, and FTP server 45 may be disposed on a common server platform or on different servers.

While not required in all aspects, the shown image forming apparatus 20 may further include a user authentication processing unit 31 for authenticating a user who wants to use the log information. In this respect, the document creator may acquire information on a feedback of a user for the generated document using the E-mail address of the user acquired in the user authentication process. While not restricted thereto, the user feedback information can include information relating to utilization, satisfaction, complaint, improvements, etc. related to the document.

Hereinafter, a log information transmitting method using metadata according to an exemplary embodiment of the present invention will be described in detail with reference to FIGS. 1 to 9.

A document creator sets up metadata for receiving log information in the host device 10 (S10). That is, the document creator sets up information on an E-mail account 41 and SMB/FTP servers 42, 43. In operation S10, at least one of the E-mail account 41, SMB server 42 and FTP server 43 is set up, which is performed through the UI screen shown in FIGS. 2 to 4. As described above, the metadata refers to data which includes information on the account and servers for receiving the log information about a document generated by the document creator, and may be included in printing data. The metadata may be generated in the printer driver 15 or an application program of the host device 10.

Figure 9:
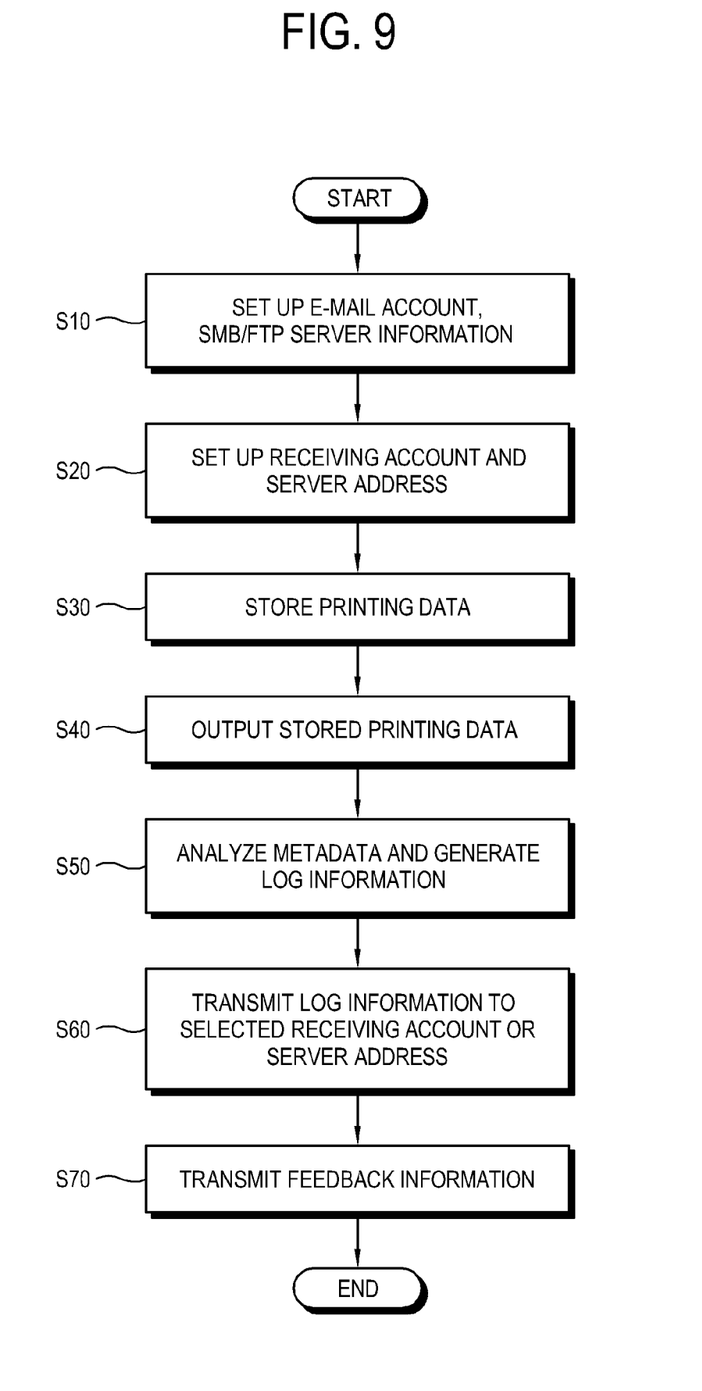
FIG. 9 is a flowchart illustrating a method of transmitting log information using metadata according to an exemplary embodiment of the present invention.

The printing data converted through the printer driver 15 is stored in at least one of the storage unit 21 of the image forming apparatus 20 and a server (not shown) (S30). Then, the stored printing data is outputted according to a command of a user (S40). In this respect, the output of the printing data includes at least one of outputting, editing, copying and transmitting of the document. While not limited thereto, an example of outputting includes printing of the document, and an example of transmitting includes faxing of the document.

After the printing data is outputted, the metadata is analyzed to generate the log information on the document with respect to the user who outputted the document (S50). Then, the log information on the output document is transmitted to at least one of the set up receiving account (E-mail) 41, SMB server 42 and FTP server 43 (S60). In this respect, the at least one of the E-mail address 41, SMB server 42 and FTP server 43 to which the log information is to be transmitted may be inputted by the user. To this end and while not required in all aspects, the method of the present embodiment further includes setting up the account and server addresses for receiving log information (S20). Operation S20 may include displaying a recipient to which the log information is to be transmitted. That is, the account and the types and addresses of the servers for receiving the log information are set up through the UI screen shown in FIG. 7. The log information includes a user name, ID, the number of copies, operation time and an Internet address of the image forming apparatus 20 for a printing operation. Further, the E-mail account 41, SMB server 42 and FTP server 43 may be selected in plurality (i.e., the E-mail account 41 and the SMB server 42 but not the FTP server 43), or can be selected individually (i.e., the E-mail account 41 only and not the SMB server 42 and FTP server 43).

Accordingly, the document creator may easily acquire and manage information about a user and utilization for a specific document and about a host device 10 through which the document is outputted based on the log information in an aspect of the invention.

While not required in all aspects, the shown embodiment further includes authenticating a user who wants to use the document through the user authentication processing unit 27. Specifically, the shown method further includes acquiring information on a feedback of a user using an E-mail address of the user acquired in the user authentication process (S70). In this case, when the user enters an email address during the authentication process or where the authentication associates the user with the email address and instructs the image forming apparatus 20 to output the document, the document creator may automatically acquire the feedback information from the authenticated user, such as utilization for the generated document, satisfaction or complaint, improvements, etc. using the E-mail or messaging address of the user stored in the image forming apparatus through the user authentication process. Such feedback information can be in addition to the log information transmitted in accordance with the metadata, and can be sent to another destination other than the destination included in the metadata for the log information. The address to which the feedback is sent can be included in the metadata and can be an email address or other messaging address chosen by the document creator.

As described above, the method of transmitting log information on a document using metadata, the host device, the image forming apparatus and the image forming system using the same method according to aspects of the present invention can generate the log information about a user and utilization on a specific document using metadata generated by a document creator and transmit the log information to at least one of the log information receiving account and servers, thereby managing information about the user and utilization for the generated document and about an output point (host device).

Further, according to aspects of the invention, the document creator can automatically acquire information on a feedback of the user such as utilization, satisfaction or complaint, improvements, etc. through the user authentication process using the E-mail address of the user stored in the image forming apparatus.

While not required in all aspects, all or portions of the method of the present invention can be implemented as software and/or firmware stored on one or more computer readable media and implemented by one or more processors and/or controllers.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of transmitting log information on a document using metadata, comprising:
generating printing data for the document;
setting up, in a host device, metadata including information on an account for receiving log information on the document;
attaching the metadata to the document after the printing data is generated;
storing the set up metadata and printing data of the document;
outputting the document using the printing data;
generating the log information on the outputted document, by analyzing the set up metadata with respect to the outputted document;
transmitting the generated log information, using the set up metadata including the information on the account;
authenticating a user who requests the outputting the document; and
acquiring feedback information from the user using an E-mail address of the user acquired in the authenticating,
wherein the transmitting comprises transmitting the generated log information to one or more of E-mail address, a server message block (SMB) server and a file transfer protocol (FTP) server.

2. The method according to claim 1, wherein the set up metadata comprises at least one of an account and a server address for receiving the generated log information.

3. The method according to claim 1, wherein the storing comprises storing the set up metadata and the printing data in an image forming apparatus and/or a server which are connected to the host device.

4. The method according to claim 1, wherein the outputting comprises outputting, editing, copying and/or transmitting of the document.

5. The method according to claim 1, wherein the setting up comprises receiving from a user a selection selecting which of the E-mail address, the SMB server and the FTP server to which the log information is to be transmitted.

6. The method according to claim 1, further comprising displaying a recipient to which the generated log information is to be transmitted.

7. The method according to claim 1, wherein the metadata is included in the printing data.

8. The method according to claim 1, wherein the setting up the metadata comprises generating the metadata in a printer driver and/or an application program of the host device.

9. The method according to claim 1, wherein the log information comprises a user name, identification, a number of copies, operation time, an Internet address of an image forming apparatus connected to the host device, or combinations thereof.

10. A host device, comprising:
a document creator to generate a document;
a user interface to input metadata setup information;
a printer driver to convert the generated document into printing data, to set up metadata including information on an account for receiving log information on the generated document based on the input metadata setup information, and to attach the metadata to the document after the printing data is generated;
a transmitting/receiving unit to transmit the printing data related to the document and the set up metadata which is attached to the document to an image forming apparatus and to receive the log information from the image forming apparatus based on the information on the account; and a controller to control the user interface, the printer driver and the transmitting/receiving unit, wherein the user interface is used to authenticate the user who requests output of the document and to provide feedback information from the user using an E-mail address of the user acquired in the authentication, and wherein the log information comprises a user name, identification, a number of copies, operation time, an Internet address of an image forming apparatus connected to the host device, or combinations thereof.

11. The host device according to claim 10, wherein the metadata comprises an account and/or a server address for receiving the log information.

12. The host device according to claim 10, wherein the log information comprises a user name, identification, a number of copies, operation time, an Internet address of the image forming apparatus, or combinations thereof.

13. The host device of claim 10, wherein the document creator acquires information on a feedback of the user for the generated document, the feedback information comprising information relating to at least one of utilization, satisfaction, complaint, and improvement related to the generated document.

14. An image forming apparatus connected to a host device which generates the printing data for a document and sets up metadata including information on an account for receiving log information on the document, and attaches the setup metadata to the document after the printing data is generated, comprising:

a storage unit to store the metadata and printing data related to the document received from the host device;

an output unit to output the document using the received printing data;

a log information generating unit to generate log information on the output document based on the stored metadata;

a transmitting/receiving unit to receive the metadata and printing data from the host device and to transmit the generated log information generated in the log information generating unit to a destination indicated in the stored metadata;

a controller to control the storage unit, the output unit, the log information generating unit and the transmitting/receiving unit; and a user authentication processing unit which authenticates a user who wants to output the document and acquires feedback information from the user using an E-mail address of the user, wherein the transmitting/receiving unit transmits the generated log information to the destination selectable between an E-mail address, an SMB server, and/or an FTP server according to the stored metadata.

15. The image forming apparatus according to claim 14, wherein the output unit performs outputting, editing, copying, and/or transmission of the document.

16. The image forming apparatus according to claim 14, wherein the generated log information comprises a user name, identification, a number of copies, operation time, an Internet address of the image forming apparatus, or combinations thereof.

* * * * *